United States Patent
Hurley (10) Patent No.: US 7,844,847 B2
(45) Date of Patent: Nov. 30, 2010

(54) SYSTEM AND METHOD FOR TUNING POWER CONSUMPTION AND GROUP DELAY IN WIRELESS RFICS

(75) Inventor: William Milton Hurley, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 11/522,742

(22) Filed: Sep. 18, 2006

(65) Prior Publication Data

US 2008/0072092 A1   Mar. 20, 2008

(51) Int. Cl.
G06F 1/12 (2006.01)
(52) U.S. Cl. .......... 713/400; 713/322; 713/500
(58) Field of Classification Search .......... 713/400, 713/500, 322; 327/48, 113, 145
See application file for complete search history.

(56) References Cited

U.S. PATENT DOCUMENTS

| | | | | |
|---|---|---|---|---|
| 5,150,068 A * | 9/1992 | Kawashima et al. | ........ | 327/145 |
| 5,388,232 A * | 2/1995 | Sullivan et al. | ........ | 710/105 |
| 5,438,601 A * | 8/1995 | Maegawa et al. | ........ | 377/48 |
| 5,689,660 A * | 11/1997 | Johnson et al. | ........ | 710/305 |
| 5,802,132 A * | 9/1998 | Pathikonda et al. | ........ | 377/48 |
| 5,822,596 A * | 10/1998 | Casal et al. | ........ | 713/322 |
| 5,978,281 A * | 11/1999 | Anand et al. | ........ | 365/189.05 |
| 6,029,252 A * | 2/2000 | Manning | ........ | 713/600 |
| 6,067,335 A * | 5/2000 | Yamanoi et al. | ........ | 375/374 |
| 6,247,137 B1 * | 6/2001 | Wickeraad | ........ | 713/401 |
| 6,429,704 B1 * | 8/2002 | Kanai et al. | ........ | 327/113 |
| 6,434,706 B1 * | 8/2002 | Jensen et al. | ........ | 713/500 |
| 6,512,719 B2 * | 1/2003 | Fujisawa et al. | ........ | 365/189.15 |
| 6,640,310 B2 * | 10/2003 | Jensen et al. | ........ | 713/500 |
| 7,111,186 B2 * | 9/2006 | Han et al. | ........ | 713/500 |
| 7,454,646 B2 * | 11/2008 | Lin | ........ | 713/500 |
| 2004/0215993 A1 * | 10/2004 | Han et al. | ........ | 713/400 |
| 2004/0243870 A1 * | 12/2004 | Henkel et al. | ........ | 713/400 |
| 2006/0056565 A1 * | 3/2006 | Kanehachi et al. | ........ | 375/376 |
| 2008/0288804 A1 * | 11/2008 | Gorti et al. | ........ | 713/400 |

* cited by examiner

Primary Examiner—Thomas Lee
Assistant Examiner—Zahid Choudhury (57) ABSTRACT

The present disclosure relates generally to systems and methods for tuning power consumption and group delay in circuits such as radio frequency integrated circuits (RFICs). In one example, a system includes first and second gating blocks configured to reduce a first clock signal operating at a first clock rate to a second clock rate and a third clock rate, respectively. A first processing block coupled to the first gating block operates at the second clock rate. A second processing block is coupled to the first processing block and the second gating block, and operates at the third clock rate. The first processing block changes a flag state from a first state to a second state when transmitting a first data sample to the second processing block, and changes the flag state from the second state to the first state when transmitting a second data sample to the second processing block.

20 Claims, 6 Drawing Sheets

SYSTEM AND METHOD FOR TUNING POWER CONSUMPTION AND GROUP DELAY IN WIRELESS RFICS

BACKGROUND

The continuing advancement of mixed signal application specific integrated circuit (ASIC) designs and the encroachment of digital processing in the typical wireless radio frequency integrated circuit (RFIC) spaces present unique challenges and opportunities. The inclusion of digital processing (e.g., digital signal processing) early in the RF chain of a wireless device may allow for greater processing flexibility and additional features. However, digital processing may also introduce delays associated with processing and digital transport that potentially impact the RFIC's group delay, which is the overall delay found by adding the individual delays within the RFIC. Furthermore, a digital clock rate used for digital processing is generally directly related to power consumption and consumes more power at higher frequencies, impacting the battery life of a device.

Once the signal processing design for the RFIC is completed, the group delay generally cannot be altered. In addition, most aspects of power consumption in an RFIC are relatively fixed once the design is complete. In tradeoffs that occur in the design between group delay and power consumption, current designs generally minimize group delay at the expense of power consumption, which may not be desirable in some situations. Accordingly, improvements are needed in tuning power consumption and group delay in circuits, such as those used in wireless device RFICs.

SUMMARY

In one embodiment, a radio frequency integrated circuit is provided. The circuit comprises a clock signal line coupled to a clock generator for carrying a first clock signal, wherein the first clock signal represents a first clock rate. A first gating block associated with a value M is coupled to the clock signal line, wherein the first gating block slows the first clock rate to a second clock rate that is determined at least in part by the value M. A first processing block is coupled to the first gating block, wherein the first processing block operates at the second clock rate. A second gating block associated with a value N is coupled to the clock signal line, wherein the second gating block slows the first clock rate to a third clock rate that is determined at least in part by the value N. A second processing block is coupled to the first processing block and the second gating block, wherein the second processing block operates at the third clock rate, and wherein synchronicity is maintained between the first and second processing blocks using only a flag state.

In another embodiment, a system is provided. The system comprises first and second gating blocks configured to reduce a first clock signal operating at a first clock rate to a second clock rate and a third clock rate, respectively. A first processing block is coupled to the first gating block and operates at the second clock rate. A second processing block is coupled to the first processing block and the second gating block, and operates at the third clock rate, wherein the first processing block changes a flag state from a first state to a second state when transmitting a first data sample to the second processing block, and changes the flag state from the second state to the first state when transmitting a second data sample to the second processing block.

In another embodiment, a method is provided. The method includes generating a main clock rate at a first frequency. A first gating block receives the main clock rate and slows the main clock rate to a second frequency. A second gating block receives the main clock rate and slows the main clock rate to a third frequency that is different than the second frequency. A first processing block is run at the second frequency and a second processing block is run at the third frequency. A flag state is changed by the first processing block to indicate that the second processing block can start processing a first data sample being transmitted by the first processing block, wherein the flag state is not changed again until the first processing block indicates that the second processing block can start processing a second data sample being transmitted by the first processing block.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The delay of a signal through a digital signal processing (DSP) element in a circuit, such as an RFIC, includes two components: processing delay and transport delay. Processing delay is dependent on the application specific sample rate and processing. This delay is essentially constant and generally cannot be altered without changing the algorithms and architecture of the RFIC. Transport delay is the overhead delay related to transporting data from element to element within the RFIC. Pipelining within the design may contribute further to transport delay. This delay is implementation specific, but is generally static once a design has been completed.

For these reasons, once the signal processing design for the RFIC is completed, the group delay generally cannot be altered. Therefore, if a processing chain made up of multiple DSP elements in an RFIC is subsequently used for applications where more relaxed group delay budgets are possible, there is no opportunity to trade group delay budget for any other parameter in the RFIC.

Power consumption in a circuit such as an RFIC includes power lost to leakage, as well as power consumed for input/output (I/O) power, toggling power, and power needed to drive clock trees at a given rate. Leakage is relatively fixed and I/O power is also fixed for the purposes of this disclosure. Toggling power is associated with data flow and is relatively fixed once the RFIC architecture is in place. The power used to drive clock trees is dependent on a number of factors, including frequency.

For minimum power consumption, each processing block would ideally run at the minimum frequency required to perform its function. However, digital systems are typically designed as synchronous systems in which a single clock is used. Therefore, the clock rate runs at the fastest rate needed by any of the processing blocks in the digital system, which wastes clock tree power for blocks requiring less processing capacity. Further, transport delay is minimized, but is not adjustable due to the single clock.

Conventional circuits are typically designed to minimize the transport delay component of group delay at the expense of power consumption. Such conventional circuits do not provide the ability to trade power consumption for group delay in order to provide an optimal solution for a particular application.

Figure 1:
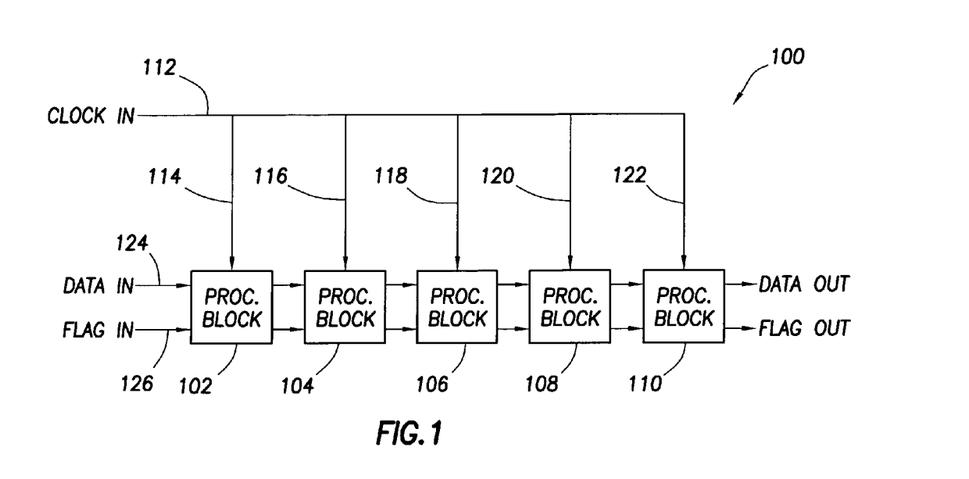
FIG. 1 is a block diagram illustrating clock distribution in a conventional circuit.

Referring to FIG. 1, a conventional distribution of clocking in a circuit is illustrated using a circuit 100. The circuit 100 includes multiple processing (e.g., DSP) blocks 102, 104, 106, 108, and 110. A single clock signal is distributed to each processing block 102, 104, 106, 108, and 110 via a clock line 112 that couples to the processing blocks via clock lines 114, 116, 118, 120, and 122, respectively. A data line 124 carries data into and out of each processing block 102, 104, 106, 108, and 110. A flag line 126 carries a flag signal into and out of each processing block 102, 104, 106, 108, and 110. It is understood that lines may be combined if desired, and the numbering of various lines is for purposes of convenience and does not in itself indicate that lines are separate.

Although some of the processing blocks 102, 104, 106, 108, and 110 may be able to operate at a lower frequency than other blocks, the use of a single clock signal may necessitate a faster than optimal rate for at least some of the blocks. For example, if the processing block 102 is able to run more slowly than the rate of the single clock signal, the circuit 100 cannot lower the clock rate of the processing block 102 to save power due to the single clock signal. Furthermore, the transport delay of the circuit 100 is fixed at the minimum rate.

Figure 2:
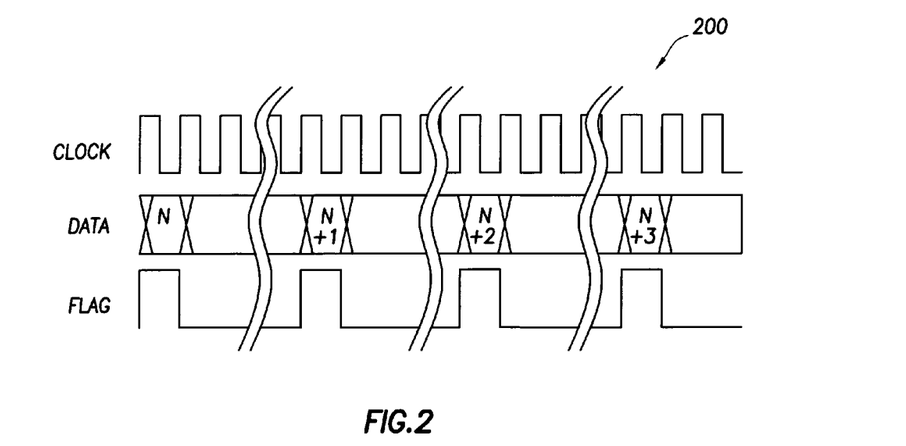
FIG. 2 is a diagram of a conventional interface illustrating timing within the circuit of FIG. 1.

With additional reference to FIG. 2, a conventional interface 200 that may be used with the circuit 100 of FIG. 1 is illustrated. The interface 200 is based on a single distributed clock. The interface 200 may be positioned between processing blocks (e.g., the processing blocks 102 and 104 of FIG. 1). The interface 200 is based on a clock signal received by each processing block 102 and 104, a data signal, and a flag signal. In the present example, data is sent after every M clock pulses, where M is an integer value that remains constant for both of the processing blocks 102 and 104. The flag signal is also sent based on the clock pulses (e.g., the flag is asserted for one full clock cycle and then de-asserted for a given number of clock cycles). It is noted that the substantially vertical wavy lines of FIG. 2 indicate an arbitrary amount of time.

Generally, with such an interface, if the clock rate of the transmitting block (e.g., the processing block 102) is not equal to the clock rate of the receiving block (e.g., the processing block 104), the interface will fail and the signal processing chain provided by the circuit 100 will not operate correctly. The inclusion of a mechanism such as first-in first-out (FIFO) queuing between the processing blocks 102 and 104 may enable the interface 200 to work despite the existence of different clock rates, but requires additional overhead that may negate the benefit of clock reduction.

Figure 3:
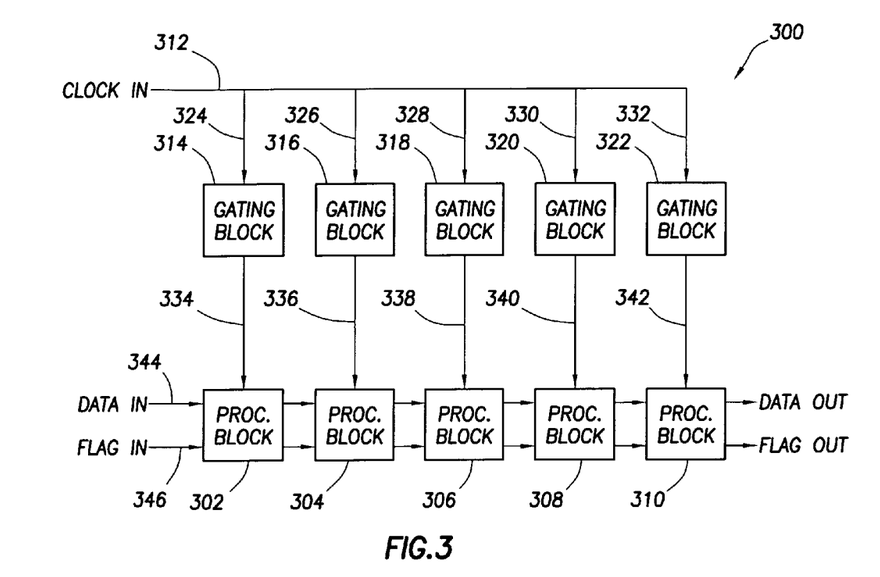
FIG. 3 is a block diagram illustrating one embodiment of clock distribution in a circuit according to aspects of the present invention.

Referring to FIG. 3, a circuit 300 illustrates one embodiment of a structure that may enable the use of a differing clock rate for each of a plurality of processing blocks 302, 304, 306, 308, and 310. A single clock signal provided by a main clock line 312 is distributed to gating blocks 314, 316, 318, 320, and 322 via clock lines 324, 326, 328, 330, and 332, respectively. The gating blocks 314, 316, 318, 320, and 322 are each coupled to a corresponding processing block 302, 304, 306, 308, and 310, via clock lines 334, 336, 338, 340, and 342, respectively. A data line 344 carries data into and out of each processing block 302, 304, 306, 308, and 310. A flag line 346 carries a flag signal into and out of each processing block 302, 304, 306, 308, and 310. For purposes of example, the circuit 300 is described as a signal processing chain in a RFIC wireless receiver, but it is understood that the present disclosure may be applied to many different circuits and circuit environments.

In technologies where the group delay budget may permit, it may be desirable to add to the transport delay and reduce the clock rate provided by the clock signal. This may lessen power consumption in devices such as wireless terminals that may have low power requirements. For example, some technologies, like Wideband Code Division Multiple Access (WCDMA), may not be as sensitive to group delay as other technologies, such as General Packet Radio Service (GPRS) Enhanced Data rates for Global Evolution (EDGE). Accordingly, the tuning parameters of a device's power consumption in relation to its group delay may vary depending on the device's technology. When tuning the group delay and power consumption, the processing blocks 302, 304, 306, 308, and 310 should still perform the required functions and interface properly despite their adjusted clock rates. Accordingly, the use of different clock rates may enable the lowest possible clock rate to be selected for a particular processing block, which will lower the power consumption of the circuit 300 without negatively impacting the processing chain.

As illustrated in FIG. 3, gating blocks 314, 316, 318, 320, and 322 correspond to processing blocks 302, 304, 306, 308, and 310, respectively. The single higher speed clock is run though the individual clock gating blocks 314, 316, 318, 320, and 322 to remove clock pulses and effectively lower the clock rate of each corresponding processing block 302, 304, 306, 308, and 310. Each gating block 314, 316, 318, 320, and 322 may reduce the higher speed clock signal to a lower frequency or may pass the higher speed clock signal through to their respective processing blocks unchanged.

Figure 4:
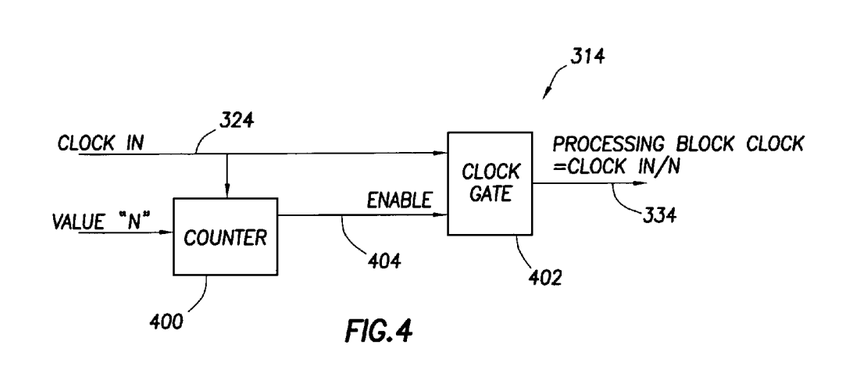
FIG. 4 is a block diagram of one embodiment of a gating block that may be used with the circuit of FIG. 3.

With additional reference to FIG. 4, one embodiment of a gating block, such as the gating block 314 of FIG. 3, is illustrated. A clock signal (e.g., from the single higher speed clock of FIG. 3) enters the gating block 314 via the clock line 324 (FIG. 3). The clock signal may be run though the gating block 314 to remove clock pulses and effectively lower the clock rate of the corresponding processing block 302.

In the present example, the gating block 314 includes a counter 400 and a clock gate 402. The counter 400 receives the single higher speed clock and a division factor "N" as inputs. The output of the counter 400 feeds into the clock gate 402 as an enable signal 404. The clock gate 402 receives the single higher speed clock and the enable signal as inputs, and outputs a reduced clock rate to the processing block 302 via the clock line 334.

In the present embodiment, the gating block 314 effectively counts clock pulses. Every N number of clock pulses, a single clock pulse is transferred to the processing block 302. For example, if the minimum clock rate required for the processing block 302 is ¼ of the higher speed clock, then N may be set to four. In this example, one clock pulse would be transferred to the processing block 302 for every four clock pulses received via the clock line 324.

It is noted that different values of N may be used. Continuing the above example where the minimum clock rate required for the processing block 302 is ¼ of the higher speed clock, N may be set to one, two, or three and the processing block 302 may operate at a faster rate and simply have more idle time in processing. Varying N between one and four varies the transport delay of the processing block 302. A value of one for N minimizes the transport delay, where each register of transport delay requires one period of the highest speed clock (e.g., the higher speed clock is not slowed down). If N is increased so the clock rate of the processing block 302 is the minimum required, then each register of transport delay requires one full data sample time. Values of two and three provide delays between that of one and four. The values of N may be predefined or may be set dynamically by a processor controlling the circuit 300, such as the host controller of a wireless device. Furthermore, although the values of N are integer values in the present example, it is understood that non-integer values may be used in some embodiments.

Figure 5:
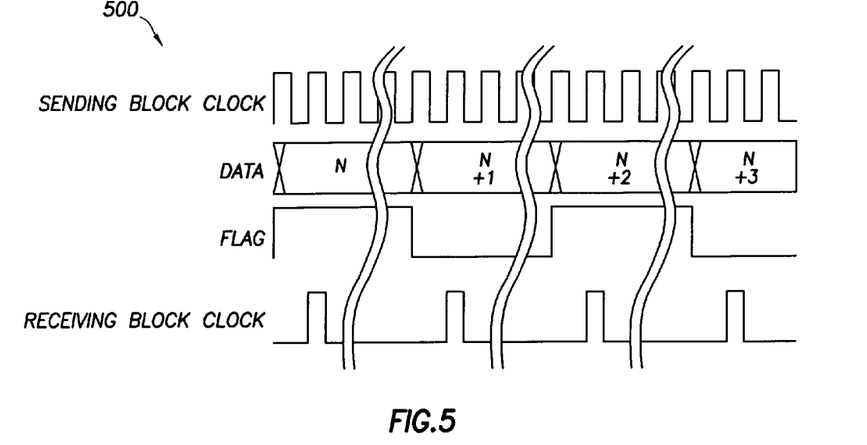
FIG. 5 is a diagram of one embodiment of an interface illustrating timing within the circuit of FIG. 3.

With additional reference to FIG. 5, one embodiment of an interface 500 illustrates timing that may occur within the circuit 300 of FIG. 3. Although the circuit 300 is based on a single clock as described previously, the single clock may be modified by gating blocks so that each processing block may be operating at a different clock rate. For purpose of example, the sending block is processing block 302 of FIG. 3 and the receiving block is processing block 304.

As can be seen in FIG. 5, the sending block 302 has a clock rate that is faster than the clock rate of the receiving block (e.g., frequency of the sending block clock>frequency of the receiving block clock). In a conventional circuit, this may cause the interface to fail without the use of a mechanism such as a FIFO. However, in the present example, the transmitting block 302 changes the state of the flag line when transmitting data. The receiving block 304 uses a change of state of the flag line to begin processing a new sample. Accordingly, using such a flag state change process, data may pass across the interface between the processing blocks 302 and 304 correctly as long as the receiving block clock is as fast as the sample rate. It is noted that the substantially vertical wavy lines of FIG. 5 indicate an arbitrary amount of time.

As described previously, technologies such as WCDMA may be less sensitive to group delay than technologies such as GPRS EDGE. Because altering the flag state as described above allows a suitable handshaking technique if used in a system that is not overly sensitive to group delay through the receiver chain, the group delay may be lowered to the minimum. Accordingly, in some examples, about 2× of group delay can be traded for reasonable power savings, as will be described below with more detailed examples. For more sensitive technologies, like GPRS EDGE, the circuit can be configured to have less group delay and lower power savings. Accordingly, the use of gating blocks, in conjunction with the flag state change process illustrated with the interface 500, may be used to set the group delay for individual groups within a signal processing block in order to set the overall group delay of the processing chain.

For purposes of example, assume that the processing chain of FIG. 3 includes only the five processing blocks 302, 304, 306, 308, and 310. Each of the processing blocks 302, 304, 306, 308, and 310 contains 15 μs of processing delay with a sample rate of 2 MHz. Furthermore, the fastest clock rate required in the circuit 300 is 16 MHz and is used by only one of the processing blocks 302, 304, 306, 308, and 310. The remaining four processing blocks only require 2 MHz to operate. Further assume each processing block 302, 304, 306, 308, and 310 contains two registers of transport delay.

In a RFIC based on a conventional circuit (e.g., the circuit 100 of FIG. 1), the entire processing chain runs at 16 MHz. Accordingly, the circuit 100 consumes maximum power and has a group delay of 15 μs+((2 MHz*5 processing blocks) *1/16 MHz=15.625 μs. As there is no way to tune the power consumption and group delay of the circuit 100 after the circuit is designed, the maximum power and calculated group delay are relatively constant.

Using aspects of the present invention as described above, in the circuit 300 of FIG. 3 for example, power may be saved by increasing the group delay to 15 μs+((2 MHz*1 processing block)*1/16 MHz)+((8 MHz*1 processing block)*½ MHz) =19.125 μs if the group delay budget allows. Accordingly, by reducing the clock rate to 2 MHz for the four processing blocks that only need to run at 2 MHz and increasing the group delay, the clock tree power needed for four of the five processing blocks 302, 304, 306, 308, and 310 may be reduced. Accordingly, aspects of the present disclosure may be used to achieve the lowest possible clock rates and, therefore, the lowest power consumption possible for a particular circuit.

It is understood that the lowest possible clock rates need not be used, and that higher clock rates can be used if desired. For example, if the group delay resulting from the use of the lowest possible clock rates is not allowable for a particular circuit, the clock rates may be increased for one or more of the processing blocks. Continuing the previous example, if the group delay for the circuit 300 is to be no greater than 17.5 μs, setting the clock rates of the four processing blocks to 2 MHz is not permissible because the resulting group delay is 19.125 μs. Accordingly, the clock rate for the four processing blocks may be increased to 4 MHz, which will result in higher power consumption than the 2 MHz clock rate, but will reduce the group delay to 15 μs+((2 MHz*1 processing block)*1/16 MHz)+((8 MHz*1 processing block)*¼ MHz)=17.125 μs. Accordingly, power consumption and group delay may be balanced to achieve an optimal result for a particular circuit.

In another example, assume that a processing chain includes eight processing blocks (not shown) that contain 15 us of processing delay with a sample rate of 2 MHz. Further assume that the fastest clock rate required in the system is 16 MHz and is used by one processing block. The remaining seven processing blocks only require 2 MHz to operate. Also assume that each processing block contains two registers of transport delay.

In a conventional circuit, the entire processing chain runs at 16 MHz, consuming maximum power and having a group delay of 15 μs+((2 MHz*8 processing blocks)*1/16 MHz)=16 μs. Applying aspects of the present invention, the circuit may save power by increasing the group delay to 15 μs+((2 MHz*1 processing block)*1/16 MHz)+((2 MHz*7 processing blocks)

Figure 6:
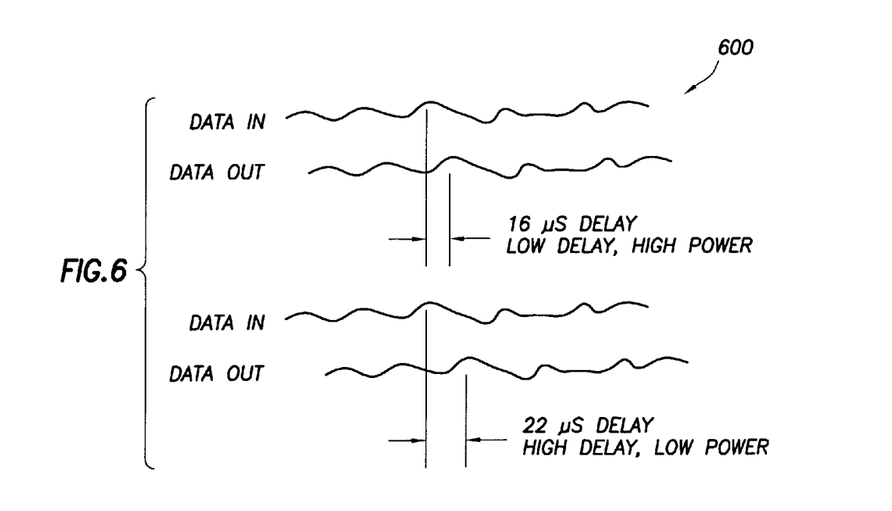
FIG. 6 is a diagram illustrating an example of results that may be achieved from tuning power consumption and group delay in the circuit of FIG. 3.

*½ MHz)=22.125 μs if the group delay budget allows. With the longer group delay, the clock rate is reduced to 2 MHz for all but one of the eight processing blocks, significantly reducing clock tree power for seven of the eight processing blocks as is illustrated in FIG. 6.

It is understood that the preceding examples are for purposes of illustration only and are not limiting. For example, different clock rates, gating block structures, and similar factors may result in different tuning parameters for power consumption and group delay.

Figure 7:
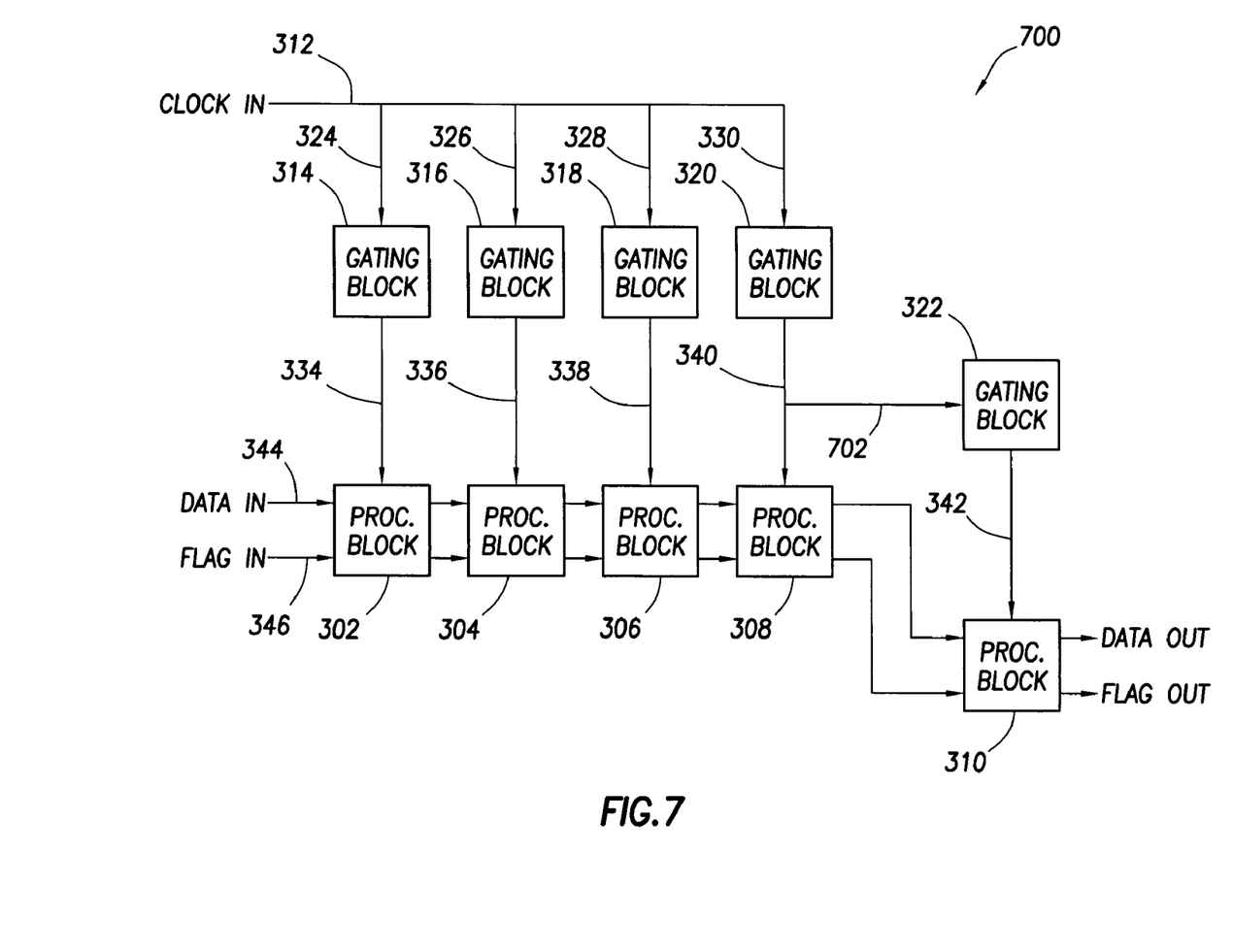
FIG. 7 is a block diagram illustrating another embodiment of clock distribution in a circuit according to aspects of the present invention.

Referring to FIG. 7, in another embodiment, a circuit 700 similar to the circuit 300 of FIG. 3 is illustrated. The circuit 700 includes a cascading gating block structure as illustrated by the gating blocks 320 and 322. More specifically, rather than feeding the higher clock rate into the gating block 322 via the line 332, the gating block 322 receives the output of the gating block 320 via a clock line 702. Accordingly, the input to the gating block 322 is dependent on the gating block 320.

Figure 8:
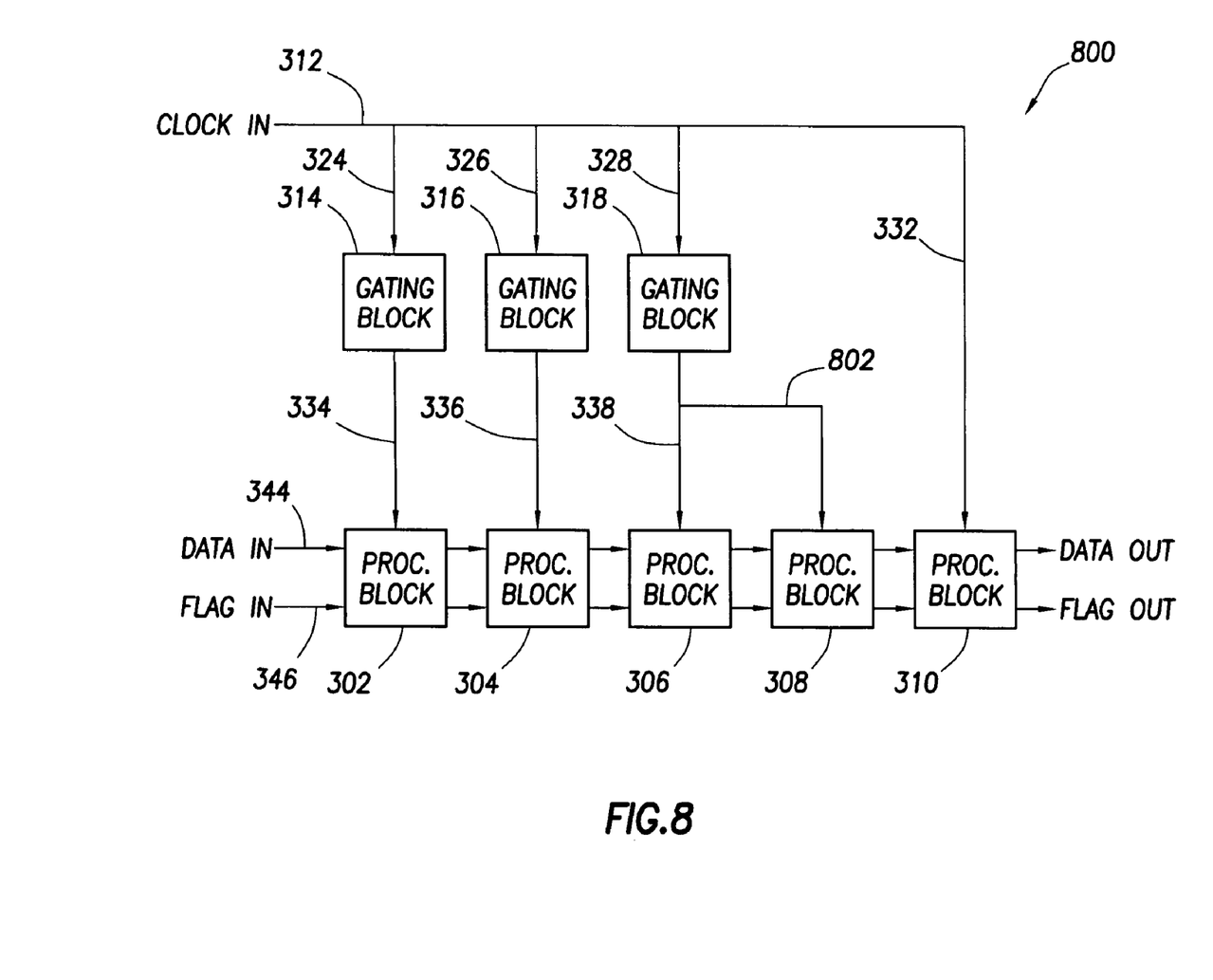
FIG. 8 is a block diagram illustrating yet another embodiment of clock distribution in a circuit according to aspects of the present invention.

Referring to FIG. 8, in yet another embodiment, a circuit 800 similar to the circuit 300 of FIG. 3 is illustrated. The circuit 800 includes two processing blocks 306 and 308 running off of a single gating block 318. More specifically, rather than feeding the processing block 308 via a gating block 320 (FIG. 3), the processing block 308 receives its clock signal from the gating block 318 via a clock line 802. In addition, the processing block 310 may receive a clock signal directly from the main clock line 312. More specifically, the gating block 322 (FIG. 3) has been removed. It is noted that removing the gating block 322 may have the same effect as setting N equal to one in the gating block structure illustrated in FIG. 4.

Accordingly, it is understood that variations of the circuit 300 of FIG. 3 may be provided. Furthermore, various elements of circuits, such as the circuits 300 of FIG. 3, 700 of FIG. 7, and 800 of FIG. 8 may be combined as desired. In addition, the clock reduction technique of using a gating block may be replaced with other clock reducing mechanism, such as a direct divider. However, the use of a direct divider would not allow for a divisor of one. In addition, using a mechanism such as one or more FIFOs may allow for asynchronous transfers, but may negate the usefulness of at least portions of the present disclosure due to increased silicon usage.

Figure 9:
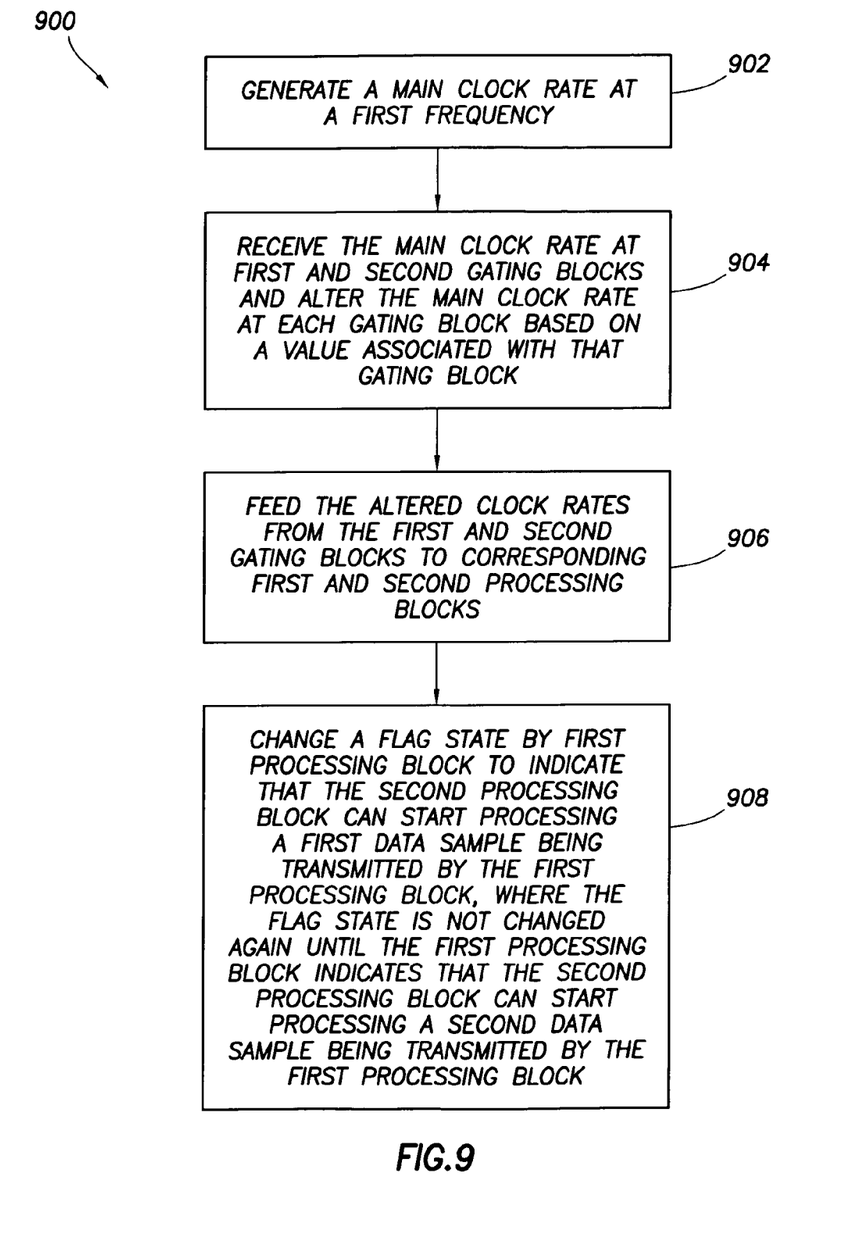
FIG. 9 is a flowchart illustrating one embodiment of a method for tuning power consumption and group delay.

Referring to FIG. 9, in one embodiment, a method 900 may be used to adjust clock rates within a digital processing circuit, such as a DSP within an RFIC, to an optimal rate for balancing group delay and power consumption. Furthermore, the method 900 may maintain synchronous data transfer between processing blocks by the use of a flag state, thereby eliminating the need for mechanisms such as FIFOs typically necessary between processing blocks in different clock domains. In the present embodiment, the clock reduction comes at the expense of an increase in group delay. Accordingly, the method 900 may be used to allow a processor (e.g., a controlling processor in a wireless terminal) to adjust group delay to a maximum allowable level and reduce power consumption.

In step 902, the method 100 may generate a main clock rate at a first frequency. In step 904, the main clock rate may be received at first and second gating blocks (e.g., the gating blocks 314 and 316 of FIG. 3) and may be altered at each gating block based on a value associated with that gating block. It is understood that one or both gating blocks may also pass the main clock rate on unchanged, as has been described above. In step 906, the clock rates (altered or unaltered) may be fed from the first and second gating blocks 314 and 316 to corresponding first and second processing blocks (e.g., the processing blocks 302 and 304 of FIG. 3).

In step 908, the first processing block 302 changes the state of a flag line (e.g., the flag line 346 of FIG. 3) to indicate that the second processing block 304 can start processing a first data sample being transmitted by the first processing block. As illustrated in FIG. 4, the flag state may not be changed again until the first processing block 302 indicates that the second processing block 304 can start processing a second data sample being transmitted by the first processing block. It is understood that the flag state may be changed based on other factors. For example, rather than changing the flag state when transmitting a data sample, the first processing block 302 may change the flag state to indicate that it is ready to transmit the data sample.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. Accordingly, all such modifications are intended to be included within the scope of this disclosure.

What is claimed is:

1. A radio frequency integrated circuit comprising:
   a clock signal line coupled to a clock generator for carrying a first clock signal, wherein the first clock signal represents a first clock rate;
   a first gating block coupled to the clock signal line, and configured to slow the first clock rate to a second clock rate that is determined at least in part by a value M, the first gating block comprising a first counter having the first clock rate and the value M as inputs, the first counter configured to generate a first output signal each time the first counter counts M pulses of the first clock rate;
   a first processing block coupled to the first gating block, wherein the first processing block operates at the second clock rate;
   a second gating block coupled to the clock signal line, and configured to slow the first clock rate to a third clock rate that is determined at least in part by a value N, the second gating block comprising a second counter having the first clock rate and the value N as inputs, the second counter configured to generate a second output signal each time the second counter counts N pulses of the first clock rate; and
   a second processing block coupled to the first processing block and the second gating block, wherein the second processing block operates at the third clock rate, and wherein synchronicity is maintained between the first and second processing blocks by the first processing block changing a flag state when transmitting a data sample to the second processing block; and
   the values M and N are dynamically set by a processor that controls the integrated circuit.

2. The radio frequency integrated circuit of claim 1 wherein the first gating block further includes a clock gate having the first clock rate and the first output signal as inputs, wherein the clock gate is configured to generate the second clock rate based on the first clock rate and the first output signal.

3. The radio frequency integrated circuit of claim 2 wherein the M and N values are integers.

4. The radio frequency integrated circuit of claim 1 wherein the second and third clock rates are identical.

5. The radio frequency integrated circuit of claim 1 wherein the second and third clock rates are different.

6. The radio frequency integrated circuit of claim 1 wherein the flag state is changed on a flag signal that transmits into and out of the first processing block and the second processing block.

7. The radio frequency integrated circuit of claim 6 wherein the second processing block begins processing the data sample only when the change in the flag state is detected by the second processing block.

8. The radio frequency integrated circuit of claim 1 further comprising a third processing block coupled to the clock signal line, wherein the third processing block operates at the first clock rate.

9. The radio frequency integrated circuit of claim 1 further comprising a third processing block coupled to the first gating block, wherein the third processing block operates at the second clock rate.

10. The radio frequency integrated circuit of claim 1 further comprising:
   a third gating block coupled to the first gating block, wherein the third gating block slows the second clock rate to a fourth clock rate that is different than the third clock rate; and
   a third processing block coupled to the third gating block, wherein the third processing block operates at the fourth clock rate.

11. A system comprising:
   first and second gating blocks configured to reduce a first clock signal operating at a first clock rate to a second clock rate and a third clock rate, respectively;
   a first processing block coupled to the first gating block and operating at the second clock rate; and
   a second processing block coupled to the first processing block and the second gating block, and operating at the third clock rate, wherein the first processing block changes a flag state from a first state to a second state when transmitting a first data sample to the second processing block, and changes the flag state from the second state to the first state when transmitting a second data sample to the second processing block,
   wherein the first gating block comprises a first counter having the first clock rate and a value M as inputs, the first counter configured to generate a first output signal each time the first counter counts M pulses of the first clock rate; and
   wherein the second gating block comprises a second counter having the first clock rate and a value N as inputs, the second counter configured to generate a second output signal each time the second counter counts N pulses of the first clock rate, and
   the values M and N are dynamically set by a processor that controls the integrated circuit.

12. The system of claim 11 wherein the second processing block begins processing the first data sample only when the flag state changes from the first state to the second state and processes the second data sample only when the flag state changes from the second state to the first state.

13. The system of claim 11 wherein the second and third clock rates are different.

14. The system of claim 11 wherein the first gating block further includes a clock gate having the first clock rate and the first output signal as inputs, wherein the clock gate is configured to generate the second clock rate based on the first clock rate and the first output signal.

15. The system of claim 14 wherein the M and N values are integers.

16. The system of claim 11 further comprising:
   a third gating block configured to maintain the first clock rate; and
   a third processing block coupled to the third gating block and operating at the first clock rate.

17. A method comprising:
   generating a main clock rate at a first frequency;
   receiving the main clock rate at a first gating block and slowing the main clock rate to a second frequency by generating a first output signal each time a first counter counts M pulses of the first clock rate;
   receiving the main clock rate at a second gating block and slowing the main clock rate to a third frequency that is different than the second frequency by generating a second output signal each time a second counter counts N pulses of the first clock rate;
   running a first processing block at the second frequency and a second processing block at the third frequency; and
   changing a flag state by the first processing block to indicate that the second processing block can start processing a first data sample being transmitted by the first processing block, wherein the flag state is not changed again until the first processing block indicates that the second processing block can start processing a second data sample being transmitted by the first processing block, and
   the values M and N are dynamically set by a processor that controls the integrated circuit.

18. The method of claim 17 further comprising running a third processing block at the first frequency.

19. The method of claim 17 further comprising processing the first and second data samples received by the second processing block from the first processing block only after the flag state is changed.

20. The method of claim 17 wherein the M and N values are integers.

* * * * *